(12) United States Patent
Uchida et al.

(10) Patent No.: US 9,010,500 B2
(45) Date of Patent: Apr. 21, 2015

(54) HYDRAULIC BRAKE HOSE STRUCTURE

(75) Inventors: Shinpei Uchida, Osaka (JP); Shinya Hirotomi, Osaka (JP)

(73) Assignee: Shimano Inc., Osaka (JP)

( * ) Notice: Subject to any disclaimer, the term of this patent is extended or adjusted under 35 U.S.C. 154(b) by 356 days.

(21) Appl. No.: 13/096,075

(22) Filed: Apr. 28, 2011

(65) Prior Publication Data

US 2012/0273308 A1 Nov. 1, 2012

(51) Int. Cl.
| | |
|---|---|
| B62L 1/00 | (2006.01) |
| F16D 55/18 | (2006.01) |
| F16L 55/10 | (2006.01) |
| F16L 33/22 | (2006.01) |
| B60T 17/04 | (2006.01) |
| F16D 121/04 | (2012.01) |

(52) U.S. Cl.
CPC .............. *F16L 55/10* (2013.01); *F16L 33/224* (2013.01); *B60T 17/043* (2013.01); *F16D 2121/04* (2013.01)

(58) Field of Classification Search
CPC .... F16D 2121/02; F16L 17/10; B60R 21/274
USPC ........... 188/344, 24.11, 24.22, 352; 138/109; 285/1–3, 342, 343
See application file for complete search history.

(56) References Cited

U.S. PATENT DOCUMENTS

| | | | | |
|---|---|---|---|---|
| 1,578,824 | A | * | 3/1926 | Herbst et al. ................. 303/84.2 |
| 3,057,313 | A | * | 10/1962 | Setser ............................... 72/56 |
| 3,366,182 | A | * | 1/1968 | Solum .......................... 166/208 |
| 3,609,825 | A | * | 10/1971 | Pullos ............................. 24/602 |
| 3,900,223 | A | * | 8/1975 | Schafer et al. ..................... 285/4 |
| 4,550,743 | A | * | 11/1985 | McFarlane et al. ........ 137/68.23 |
| 4,842,004 | A | * | 6/1989 | Steinman ................... 137/68.19 |
| 5,174,611 | A | * | 12/1992 | Byrd et al. ...................... 285/45 |
| 6,257,267 | B1 | * | 7/2001 | Saijo et al. ................. 137/68.23 |
| 6,527,303 | B2 | | 3/2003 | Kariyama et al. |
| 6,688,440 | B2 | | 2/2004 | Matsushita et al. |
| 2009/0293735 | A1 | * | 12/2009 | Van Dillen et al. ............. 99/295 |
| 2010/0019489 | A1 | | 1/2010 | Takizawa |

FOREIGN PATENT DOCUMENTS

| | | |
|---|---|---|
| CN | 101466973 A | 6/2009 |
| DE | 41 23 383 A1 | 1/1993 |
| GB | 2 263 749 A | 8/1993 |
| JP | 2001-288001 A | 10/2001 |

OTHER PUBLICATIONS

SPX Power Team; Catalog; Non-Conductive Hoses, Prior Art to Apr. 2011.
Taiwanese Office Action of corresponding Taiwanese Application No. 100134649 dated Dec. 25, 2013.
Office Action of U.S. Appl. No. 13/566,393 dated Oct. 10, 2014.

* cited by examiner

*Primary Examiner* — Robert A Siconolfi
*Assistant Examiner* — Mahbubur Rashid
(74) *Attorney, Agent, or Firm* — Global IP Counselors (57) ABSTRACT

A hydraulic brake hose structure is basically provided with a hydraulic brake hose and a first sealing material. The hydraulic brake hose has a first end with a first opening and a second end with a second opening. The first sealing material overlies the first opening of the first end to form a first seal that seals the first opening of the first end. The first sealing material ruptures at a prescribed hydraulic fluid pressure threshold.

20 Claims, 6 Drawing Sheets

HYDRAULIC BRAKE HOSE STRUCTURE

BACKGROUND

1. Field of the Invention

This invention generally relates to a hydraulic brake hose structure that is used in a bicycle brake system.

2. Background Information

A hydraulic brake system for a bicycle typically has a brake lever that is fluidly coupled to a brake caliper by a hydraulic brake hose. The brake caliper is hydraulically controlled by hydraulic fluid flowing through the hydraulic brake hose in response to operation of the brake lever. In particular, operation of the brake lever forces hydraulic fluid through the hydraulic brake hose to the brake caliper. The hydraulic fluid then moves one of more pistons to cause the brake pads to squeeze a rotor that is attached to a hub of a bicycle wheel. To ensure proper operation of the hydraulic brake system, air in the hydraulic brake system should be removed.

SUMMARY

One aspect is to provide to a hydraulic brake hose structure that aids in avoiding air being trapped in the hose during assembly of the hydraulic brake hose in a hydraulic brake system.

In view of the state of the known technology, a hydraulic brake hose structure is provided that basically comprises a hydraulic brake hose and a first sealing material. The hydraulic brake hose has a first end with a first opening and a second end with a second opening. The first sealing material overlies the first opening of the first end to form a first seal that seals the first opening of the first end. The first sealing material ruptures at a prescribed hydraulic fluid pressure threshold.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
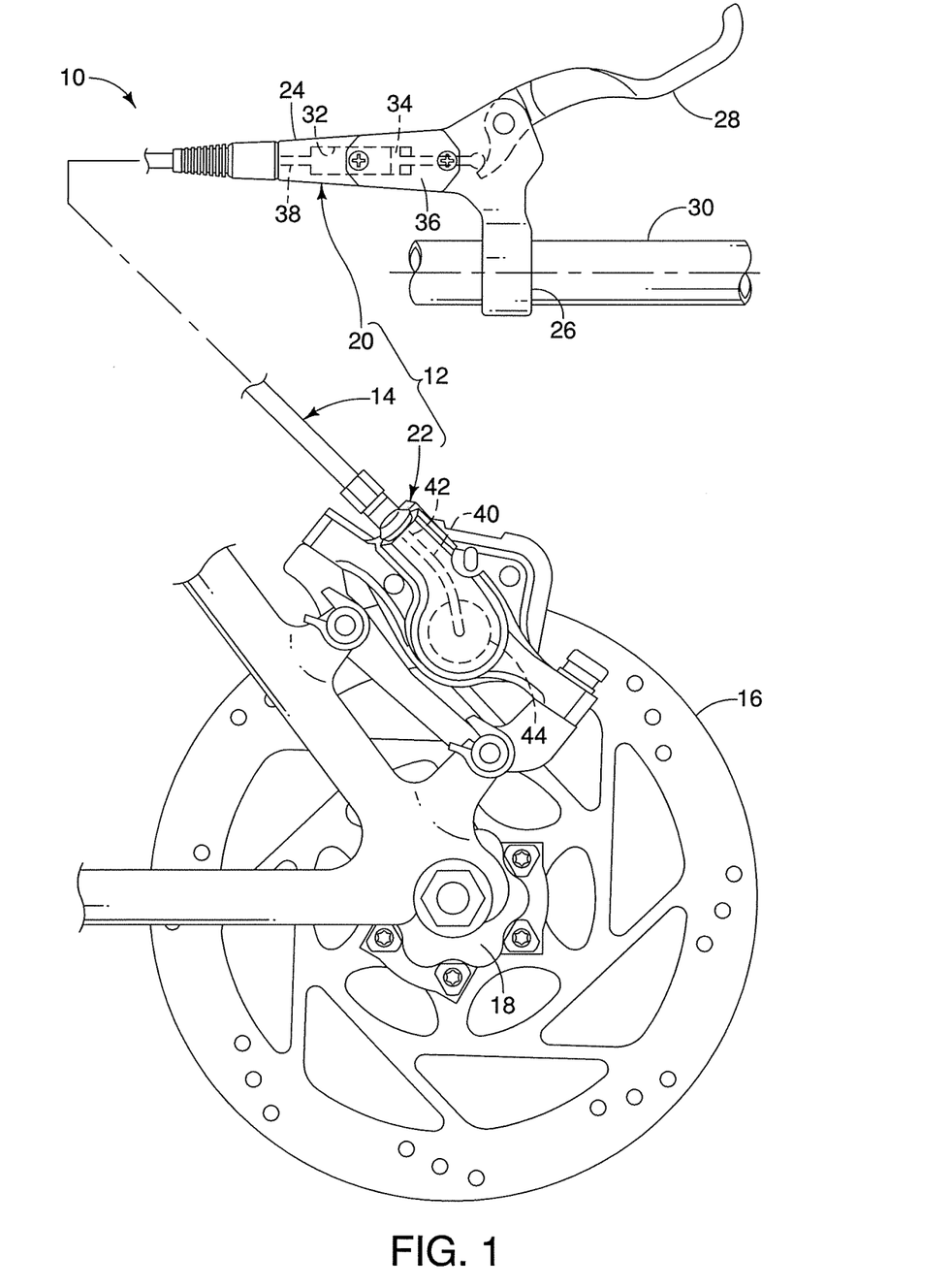
FIG. 1 is a side elevational view of a rear disc brake assembly using a hydraulic brake system with a hydraulic brake hose structure between a rear brake operating mechanism and a rear brake caliper in accordance with one illustrated embodiment.

Referring initially to FIG. 1, a rear disc brake assembly 10 is illustrated that includes with a hydraulic brake system 12 with a hydraulic brake hose structure 14 in accordance with one illustrated embodiment. As discussed below, the hydraulic brake hose structure 14 is prefilled with hydraulic fluid and sealed at each end so that the hydraulic brake system 12 can be assembled in a relatively easy manner without air being trapped in the hydraulic brake system 12.

While the hydraulic brake hose structure 14 is illustrated as being used with a rear disc brake assembly, the hydraulic brake hose structure 14 can also be used with a front disc brake assembly. The rear disc brake assembly 10 has a disc brake rotor 16 that is fixedly attached to a hub 18 of a bicycle wheel (not shown). The hydraulic brake system 12 further includes a rear brake operating mechanism 20 and a rear brake caliper 22. The caliper 22 and the rear brake operating mechanism 20 are conventional bicycle components that are hydraulically operated in a conventional manner. Since these components are conventional, they will not be discussed and/ or illustrated in detail herein.

As seen in FIG. 1, the rear brake operating mechanism 20 basically has a master cylinder 24, a clamp 26 and a brake lever 28. The clamp 26 is integrally formed with the master cylinder 24. The brake lever 28 is pivotally coupled to the master cylinder 24. The brake operating mechanism 20 is supported on a handlebar 30 via the clamp 26 in a conventional manner. The brake lever 28 is pivotally coupled to the master cylinder 24 for operating the caliper 22 as explained below. The master cylinder 24 defines a master cylinder bore or chamber 32 that has a piston 34 reciprocally mounted in the master cylinder bore 32. The master cylinder 24 also has a hydraulic fluid reservoir 36 that is in fluid communication with the master cylinder bore 32. The hydraulic fluid reservoir 36 contains the hydraulic fluid (mineral oil) which is pressurized by movement of the piston 34 in the master cylinder 32 in response to the pivotal movement of the brake lever 28 towards the handlebar 30. The master cylinder 24 has an outlet port 38 for supplying the hydraulic fluid to the caliper 22 via the hydraulic brake hose structure 14. Since the operations of the master cylinder 24 and the piston 34 are conventional, these parts will not be discussed or shown in further detail herein.

Still referring to FIG. 1, the caliper 22 basically has an internal fluid passage 40 with an inlet port 42. A piston 44 is movably mounted in the caliper 22 by fluid pressure entering the internal fluid passage 40 in a conventional manner. The brake caliper 22 is hydraulically controlled by hydraulic fluid flowing through the hydraulic brake hose structure 14 in response to operation of the brake lever 28 of the rear brake operating mechanism 20. More specifically, when the brake lever 28 of the rear brake operating mechanism 20 is operated, this causes the hydraulic fluid to be pressurized and flow through the hydraulic brake hose structure 14 into the internal fluid passage 40 via the inlet port 42. In other words, operation of the brake lever 28 forces hydraulic fluid through the hydraulic brake hose structure 14 to the brake caliper 22. As a result of the operation of the brake lever 28, the pressure in the internal fluid passage 40 increases, and thus causes the caliper 22 to apply a braking force on the disk brake rotor 16. In particular, the hydraulic fluid then moves the piston 44 to cause the brake pads (not shown) to squeeze the disk brake rotor 16. Since the operations of the caliper 22 and the piston 44 are conventional, these parts will not be discussed or shown in further detail herein.

Referring now to FIGS. 2 to 6, the hydraulic brake hose structure 14 will now be discussed in more detail. The caliper 22 and the master cylinder 24 are fluidly coupled together by the hydraulic brake hose structure 14. As explained below, preferably, the hydraulic brake hose structure 14 is completely filled with hydraulic fluid and sealed at each end prior to attachment the caliper 22 and the master cylinder 24. Moreover, the hydraulic brake hose structure 14 is attached to the caliper 22 and the master cylinder 24 in the sealed condition such that the hydraulic fluid in the hydraulic brake hose structure 14 is prevented from flowing into the caliper 22 and the master cylinder 24. However, as explained below, the caliper 22 and the master cylinder 24 can be completely filled with hydraulic fluid and sealed such that the hydraulic fluid in the hydraulic brake hose structure 14 is prevented from flowing into the caliper 22 and the master cylinder 24. With this arrangement of the hydraulic brake hose structure 14, the hydraulic brake system 12 can be assembled in a relatively easy manner without air being trapped in the hydraulic brake system 12.

Figure 2:
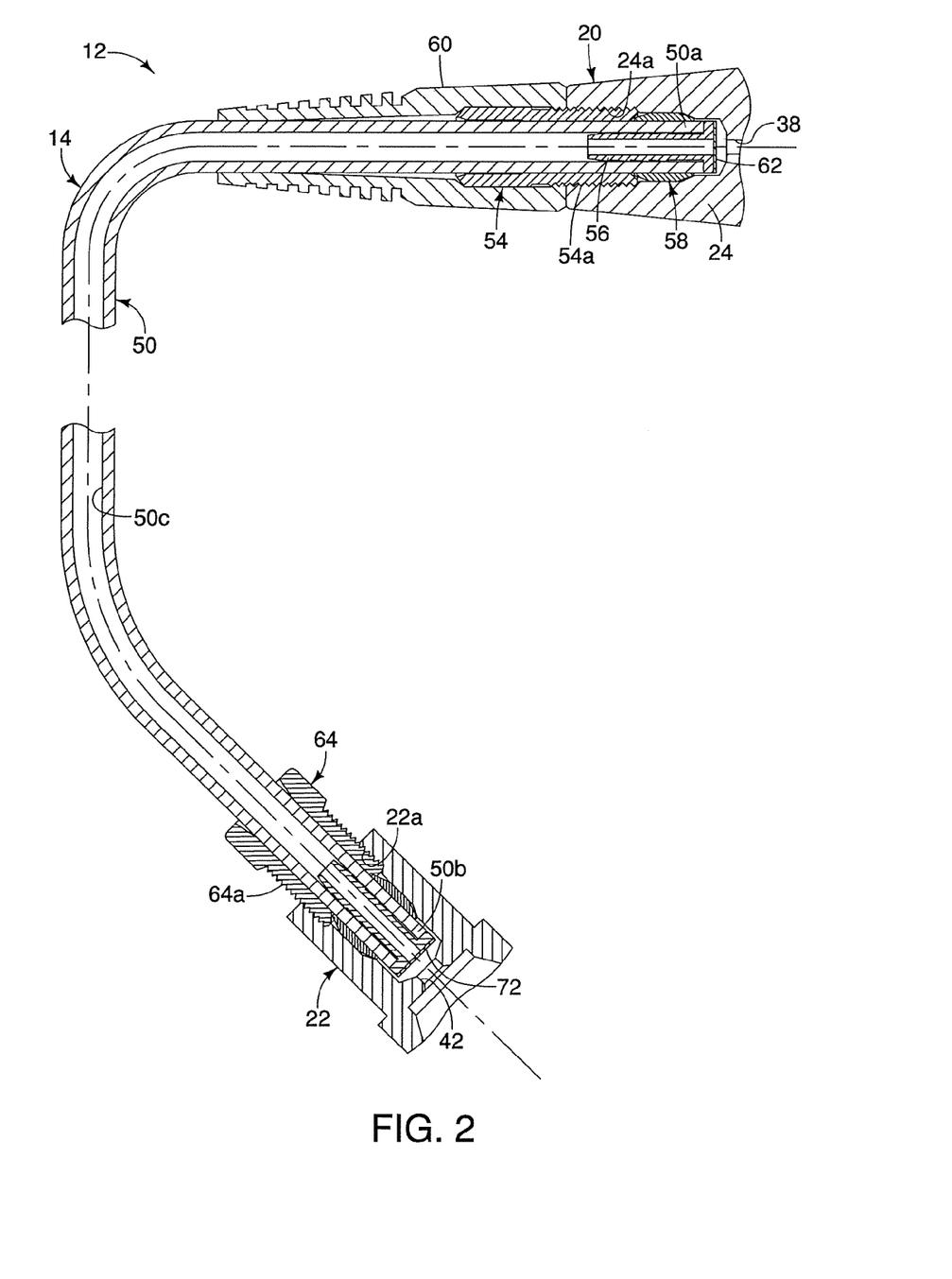
FIG. 2 is a partial cross-sectional view of the hydraulic brake hose structure illustrated in FIG. 1.

As best seen in FIG. 2, the hydraulic brake hose structure 14 basically includes a flexible tube 50, a first connector 51 and a second connector 52, which together form an unfilled and unsealed hydraulic brake hose. The flexible tube 50 is a conventional flexible tube that is used for conveying hydraulic fluid from the master cylinder 24 to the caliper 22 under pressure. The first and second connectors 51 and 52 are conventional hydraulic hose fittings. The first connector 51 is disposed over a first end portion 50a of the flexible tube 50 for attachment to the master cylinder 24 of the brake operating mechanism 20, while the second connector 52 is attached to a second end portion 50b of the flexible tube 50 for attachment to the caliper 22. The flexible tube 50 has an interior passage 50c extending between the openings of the first and second end portions 50a and 50b of the flexible tube 50. Thus, the flexible tube 50 and the first and second connectors 51 and 52 will only be briefly discussed or illustrated herein for the sake of brevity.

Figure 3:
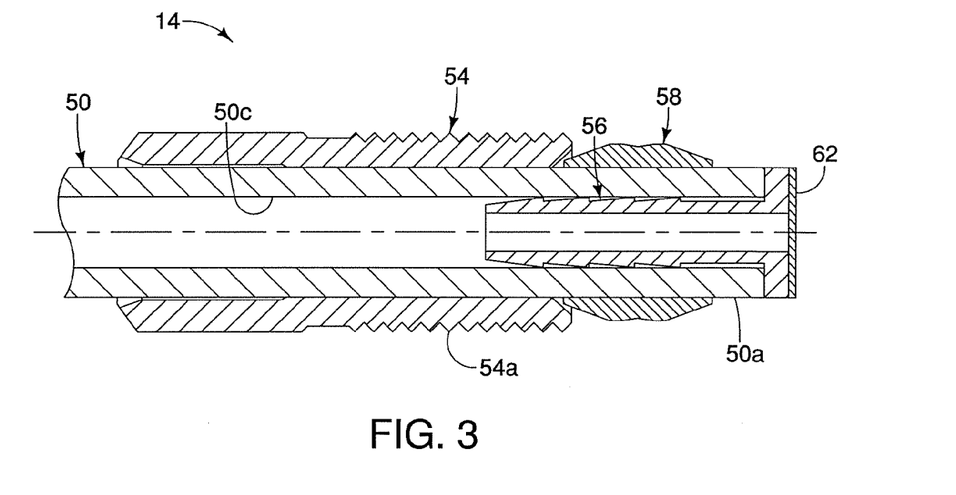
FIG. 3 is an enlarged, partial cross-sectional view of a first end of the hydraulic brake hose structure illustrated in FIGS. 1 and 2.
Figure 5:
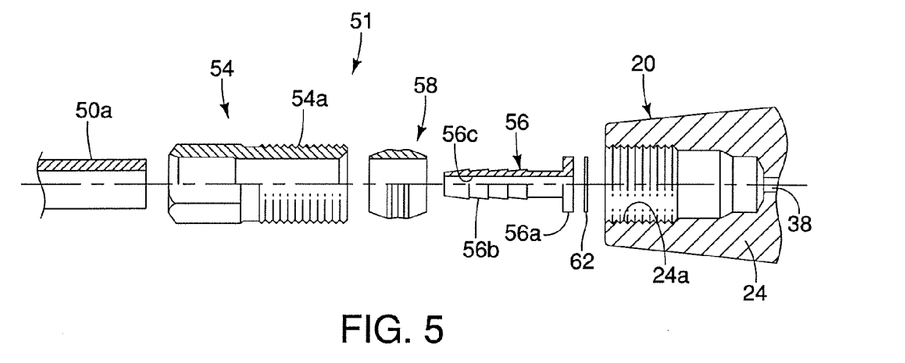
FIG. 5 is an exploded, partial cross-sectional view of the first end of the hydraulic brake hose structure illustrated in FIG. 3.

As best seen in FIGS. 3 and 5, the first connector 51 basically includes a first threaded fastening sleeve or fitting 54, a first rigid tubular insert 56 and a first tubular bushing 58. The first threaded fitting 54 is a tubular member that overlies the first end portion 50a of the flexible tube 50. The first threaded fitting 54 has an externally threaded portion 54a that is threaded into an internal threaded bore 24a of the master cylinder 24.

The first tubular insert 56 has an annular flange section 56a and a tubular section 56b. A longitudinal passageway 56c passes through the tubular section 56b and the flange section 56a. The outer surface of the tubular section 56b has a plurality of inclined barbs such that the tubular section 56b is securely retained in the interior passage 50c of the flexible tube 50. The first tubular insert 56 is designed to be retained in the first end portion end 50a of the flexible tube 50 and to provide radial support at the first end portion end 50a of the flexible tube 50. Accordingly, the first tubular insert 56 is constructed of a rigid material such as a metallic material. For example, the first tubular insert 56 can be formed of a copper or a copper alloy. Of course, any suitable rigid material can be utilized for the first tubular insert 56 as needed and/or desired.

The first tubular bushing 58 overlies the first end portion 50a of the flexible tube 50. The first tubular bushing 58 is designed to be deformed during installation of the first threaded fitting 54 into the internal threaded bore 24a of the master cylinder 24. In particular, the first tubular bushing 58 is compressed axially during installation of the first threaded fitting 54 into the internal threaded bore 24a of the master cylinder 24. As a result, the first tubular bushing 58 is deformed so as to squeeze the first end portion end 50a of the flexible tube 50 onto the first tubular insert 56. The first tubular bushing 58 is constructed of a rigid material such as a metallic material. For example, the first tubular bushing 58 can be formed of a copper or a copper alloy. Of course, any suitable rigid material can be utilized for the first tubular bushing 58 as needed and/or desired.

A flexible boot or cover 60 is optionally provided to cover the first threaded fitting 54. The cover 60 is preferably constructed of a flexible elastomeric material with good sealing properties. The cover 60 is sized to snugly engage the first end portion end 50a of the flexible tube 50 and the first threaded fitting 54 for creating a watertight seal therebetween.

The hydraulic brake hose structure 14 also includes a first sealing material 62 for sealing the first end portion 50a of the flexible tube 50. The first sealing material 62 constitutes a first seal that ruptures with an increase in fluid pressure above a prescribed hydraulic fluid pressure threshold. In the illustrated embodiment, the first sealing material 62 is a formed of a thin flexible sheet of metal foil having a thickness of less than 0.5 millimeter. More preferably, the thin sheet of metal foil forming the first sealing material 62 is in the range of 0.012 millimeter to 0.2 millimeter. In any case, the first sealing material 62 is constructed to rupture in response to the hydraulic fluid pressure developed by the operation of the brake lever 28.

In the illustrated embodiment, the first sealing material 62 is adhesively attached to the flange section 56a to overlie the opening of the passageway 56c. Thus, the first sealing material 62 form a first seal that seals the opening of the first end of the hydraulic brake hose. In other words, in the illustrated embodiment, the opening in the flange section 56a of the first tubular insert 56 constitutes the first opening of the first end of the hydraulic brake hose.

Figure 7:
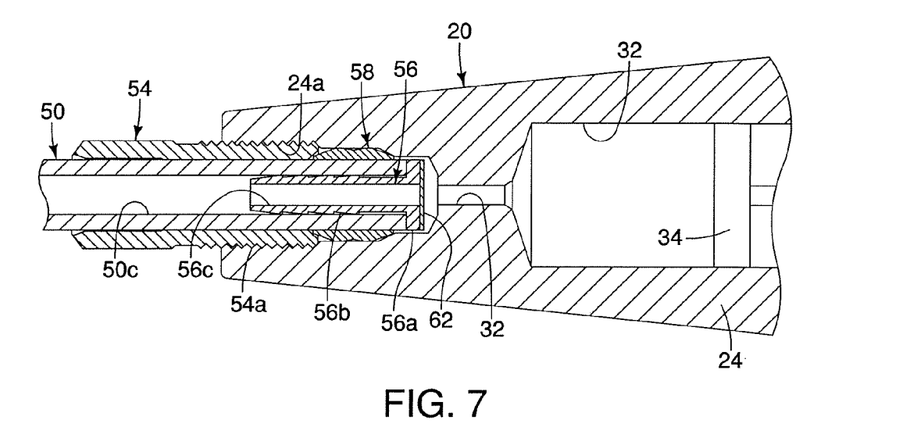
FIG. 7 is an enlarged, partial cross-sectional view of the first end of the hydraulic brake hose structure illustrated in FIG. 3 that is attached to the master cylinder housing with the first seal preventing fluid communication between the hydraulic brake hose structure and the bore of the master cylinder housing.
Figure 8:
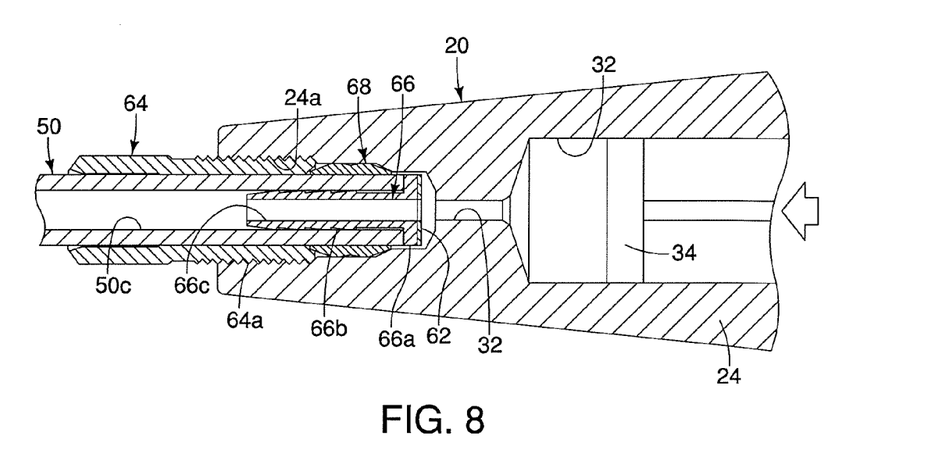
FIG. 8 is an enlarged, partial cross-sectional view of the first end of the hydraulic brake hose structure illustrated in FIG. 3 that is attached to the master cylinder housing with the first seal being broken to provide fluid communication between the hydraulic brake hose structure and the bore of the master cylinder housing.

Referring now to FIGS. 7 and 8, the first sealing material 62 prevents fluid communication between the master cylinder 24 and the passageway 56c of the first tubular insert 56. However, after attaching the first threaded fitting 54 into the internal threaded bore 24a of the master cylinder 24, the first sealing material 62 can be easily ruptured by operating the brake lever 28 (FIG. 1). In particular, as seen in FIG. 8, operating the brake lever 28 causes the piston 34 to move towards the outlet port 38 which increases the pressure of the hydraulic fluid within the master cylinder 24. This increase in the pressure of the hydraulic fluid forces the hydraulic fluid to break the first sealing material 62.

Figure 4:
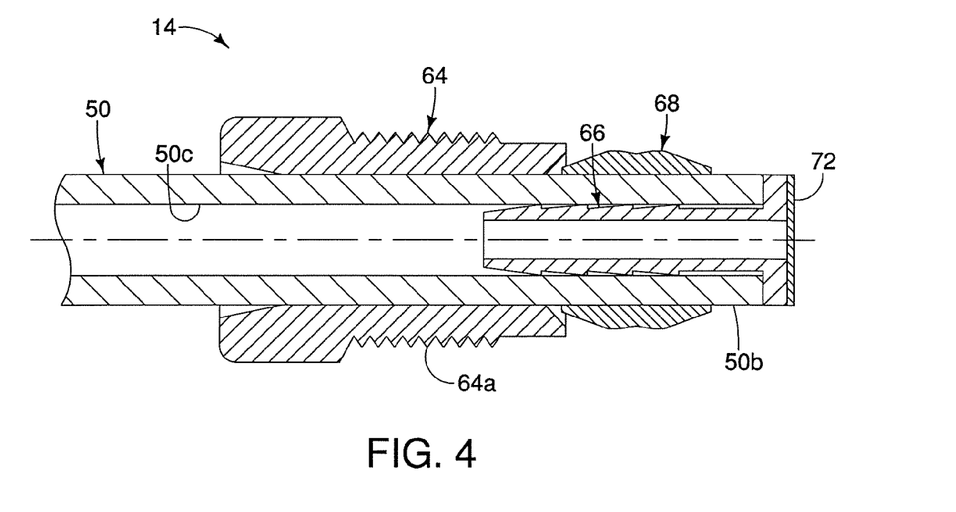
FIG. 4 is an enlarged, partial cross-sectional view of a second end of the hydraulic brake hose structure illustrated in FIGS. 1 and 2.
Figure 6:
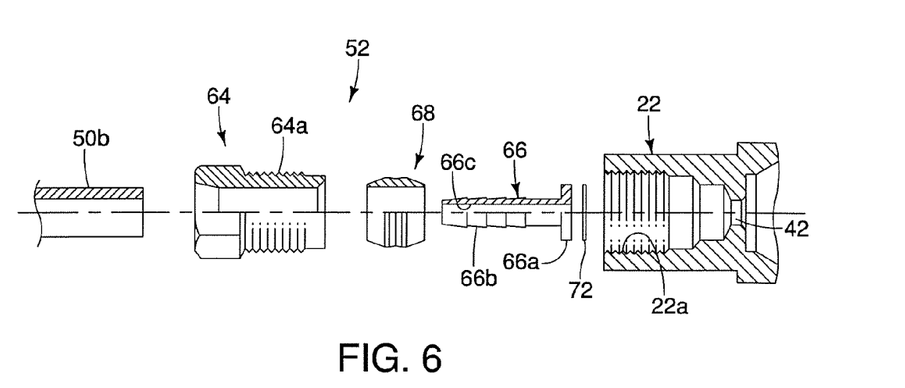
FIG. 6 is an exploded, partial cross-sectional view of the second end of the hydraulic brake hose structure illustrated in FIG. 4.

As best seen in FIGS. 4 and 6, the second connector 52 includes a threaded fastening sleeve or fitting 64, a rigid tubular insert 66 and a tubular bushing 68. The second threaded fitting 64 overlies the second end portion 50b of the flexible tube 50. The second threaded fitting 64 has an externally threaded portion 64a that is threaded into an internal threaded bore 22a of the caliper 22.

The second tubular insert 66 has an annular flange section 66a and a tubular section 66b. A longitudinal passageway 66c passes through the tubular section 66b and the flange section 66a. The outer surface of the tubular section 66b has a plurality of inclined barbs such that the tubular section 66b is securely retained in the interior passage 50c of the flexible tube 50. The second tubular insert 66 is designed to be retained in the second end portion end 50b of the flexible tube 50 and to provide radial support at the second end portion end 50b of the flexible tube 50. Accordingly, the second tubular insert 66 is constructed of a rigid material such as a metallic material. For example, the second tubular insert 66 can be formed of a copper or a copper alloy. Of course, any suitable rigid material can be utilized for the second tubular insert 66 as needed and/or desired.

The second tubular bushing 68 overlies the second end portion 50b of the flexible tube 50. The second tubular bushing 68 is designed to be deformed during installation of the second threaded fitting 64 into the internal threaded bore 22a of the caliper 22. In particular, the second tubular bushing 68 is compressed axially during installation of the second threaded fitting 64 into the internal threaded bore 22a of the caliper 22. As a result, the second tubular bushing 68 is deformed so as to squeeze the second end portion end 50b of the flexible tube 50 onto the second tubular insert 66. The second tubular bushing 68 is constructed of a rigid material such as a metallic material. For example, the second tubular bushing 68 can be formed of a copper or a copper alloy. Of course, any suitable rigid material can be utilized for the second tubular bushing 68 as needed and/or desired.

The hydraulic brake hose structure 14 also includes a second sealing material 72 for sealing the second end portion 50b of the flexible tube 50. The second sealing material 72 constitutes a second seal that ruptures with an increase in fluid pressure above a prescribed hydraulic fluid pressure threshold. In the illustrated embodiment, the second sealing material 72 is a formed of a thin flexible sheet of metal foil having a thickness of less than 0.5 millimeter. More preferably, the thin sheet of metal foil forming the second sealing material 72 is in the range of 0.012 millimeter to 0.2 millimeter. In any case, the second sealing material 72 is constructed to rupture in response to the hydraulic fluid pressure developed by the operation of the brake lever 28.

In the illustrated embodiment, the second sealing material 72 is adhesively attached to the flange section 66a to overlie the opening of the passageway 66c. Thus, the second sealing material 72 form a second seal that seals the opening of the second end of the hydraulic brake hose. In other words, in the illustrated embodiment, the opening in the flange section 66a of the second tubular insert 66 constitutes the second opening of the second end of the hydraulic brake hose. The second sealing material 72 prevents fluid communication between the caliper 22 and the passageway 66c of the second tubular insert 66. However, after attaching the second threaded fitting 64 into the internal threaded bore 22a of the caliper 22, the second sealing material 72 can be easily ruptured by operating the brake lever 28 (FIG. 1) in the same manner as the first sealing material 62, as discussed above. In particular, operating the brake lever 28 causes the piston 34 to move towards the outlet port 38 which increases the pressure of the hydraulic fluid within the master cylinder 24. This increase in the pressure of the hydraulic fluid forces the hydraulic fluid to break the first sealing material 62 and then break the second sealing material 72 so that the hydraulic fluid enters the caliper 22.

As mentioned above, the hydraulic brake hose structure 14 is prefilled with hydraulic fluid and sealed at opposite ends by the first and second sealing materials 62 and 72. Preferably, the hydraulic brake hose structure 14 is free of any air or other gas between the first and second sealing materials 62 and 72. The hydraulic brake hose structure 14 is designed to be attached to the caliper 22 and the master cylinder 24 while the hydraulic fluid is sealed with the first and second sealing materials 62 and 72. In this illustrated embodiment, the flexible tube 50 and the first and second connectors 51 and 52 constitute a hydraulic brake hose without the hydraulic fluid and the first and second sealing materials 62 and 72. On the other hand, the hydraulic brake hose structure 14 includes the hydraulic brake hose (parts 50, 51 and 52) as well as the hydraulic fluid and the first and second sealing materials 62 and 72. In the illustrated embodiment, the first end portion 50a of the flexible tube 50 and the first connector 51 constitute a first end of the hydraulic brake hose with a first opening being defined by the tubular insert 56, while the second end portion 50b of the flexible tube 50 and the second connector 52 constitute a second end of the hydraulic brake hose with a second opening being defined by the tubular insert 66. However, it will be apparent from this disclosure that other configurations of the hydraulic brake hose structure 14 are possible.

Figure 9:
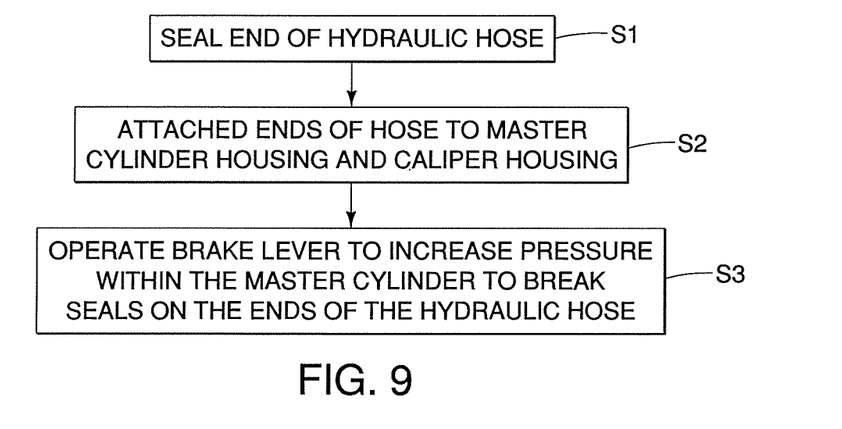
FIG. 9 is a flow chart explaining one hydraulic brake assembly method using the hydraulic brake hose structure illustrated in FIGS. 1 and 2.

Now, a method of assembly the hydraulic brake system 12 will be discussed with reference to FIGS. 7 to 9 in which the hydraulic brake system 12 can be assembled in a relatively easy manner without air being trapped in the hydraulic brake system 12. Unless otherwise specified, the following method of assembling the hydraulic brake system 12 can be performed in a different order than discussed herein. In other words, the method of assembling the hydraulic brake system 12 is not limited to the following described order of assembly unless otherwise specified. As seen in FIG. 9, in the illustrated embodiment, the flexible tube 50 is completely filled with hydraulic fluid and the opposite ends of the flexible tube 50 sealed (Step S1). In particular, in step S1, the first and second sealing materials 62 and 72 are attached to the flange sections 56a and 66a of the first and second tubular inserts 56 and 66 after the flexible tube 50 is completely filled with hydraulic fluid. In this way, the first and second sealing materials 62 and 72 cover and seal the first and second openings of the first and second ends of the hydraulic brake hose (parts 50, 51 and 52) for confining the hydraulic fluid within the flexible tube 50.

Next, the first and second connectors 51 and 52 are attached to the caliper 22 and the master cylinder 24 (Step S2) so that the first and second sealing materials 62 and 72 disposed between the first and second ends of the hydraulic brake hose (parts 50, 51 and 52) and the ports 38 and 42 of the caliper 22 and the master cylinder 24, respectively. As a result, the hydraulic fluid is sealed within the flexible tube 50 between the first and second sealing materials 62 and 72. Of course, as will become apparent from this disclosure that steps S1 and S2 can be combined such that the assembling sequence can be accomplished in several different ways. For example, the first sealing material 62 can be attached to the flange section 56a of the first tubular insert 56 and the first connector 51 can be attached to the master cylinder 24 before the flexible tube 50 is filled with hydraulic fluid and before the second sealing material 72, is attached to the flange section 66a of the second tubular insert 66.

Also at any point before, during or after steps S1 and S2, the internal fluid cavities of the caliper 22 and the master cylinder 24 are filled with hydraulic fluid. In any case, the caliper 22 and the master cylinder 24 are filled with hydraulic fluid such that the hydraulic break system 12 is free of any trapped air in the hydraulic line between the pistons 34 and 44.

Now, in step S3, the brake lever 28 is operated to cause the piston 34 to move towards the outlet port 38, which in turn increases the pressure of the hydraulic fluid within the master cylinder 24 (see FIG. 8). This increase in the pressure of the hydraulic fluid forces the hydraulic fluid to break the first sealing material 62 so that the hydraulic fluid from the master cylinder 24 enters the flexible tube 50 and then hydraulic fluid of the flexible tube 50 break the second sealing material 72 and enters the caliper 22. In this way, the hydraulic break system 12 is assembled without of any air being trapped in the hydraulic line between the pistons 34 and 44.

Figure 10:
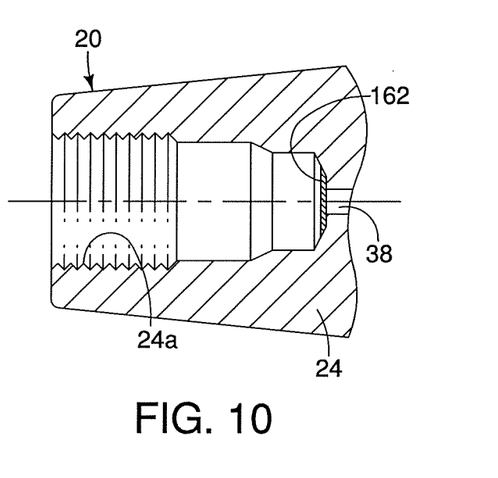
FIG. 10 is a partial cross-sectional view of the master cylinder with a foil seal covering an outlet port of the master cylinder.
Figure 11:
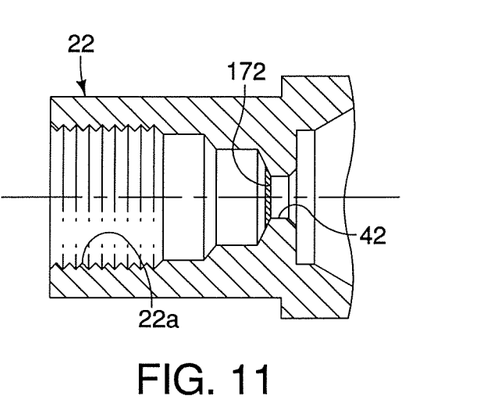
FIG. 11 is a partial cross-sectional view of the caliper housing with a foil seal covering an inlet port of the caliper.

As seen in FIGS. 10 and 11, the master cylinder 24 can be provided with a first sealing material 162 and the caliper 22 can be provided with a second sealing material 172. The first and second sealing materials 162 and 172 are identical in construction to the first and second sealing materials 62 and 72 except that the first and second sealing materials 162 and 172 are dimensioned for the master cylinder 24 and the caliper 22, respectively. In other words, the first and second sealing materials 162 and 172 rupture with an increase in fluid pressure above a prescribed hydraulic fluid pressure threshold in which the first and second sealing materials 162 and 172 will rupture. In the illustrated embodiment, the first and second sealing materials 162 and 172 are a formed of a thin flexible sheet of metal foil having a thickness of less than 0.5 millimeter. More preferably, the thin sheets of metal foil forming the first and second sealing materials 162 and 172 are in the range of 0.012 millimeter to 0.2 millimeter.

The first sealing material 162 is fixed to the master cylinder 24 such that the first sealing material 162 overlies and seals the outlet port 38 of the master cylinder 24, while the second sealing material 172 is fixed to the caliper 22 such that the second sealing material 172 overlies and seals the inlet port 42 of the caliper 11. The first and second sealing materials 162 and 172 can be used in conjunction with the first and second sealing materials 62 and 72, or any combination of the sealing materials 62, 72, 162 and 172 can be used to aid in the assembly the hydraulic brake system 12.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle hydraulic brake system comprising:
a bicycle hydraulic operating mechanism including a master cylinder, an operating lever operatively coupled to the master cylinder, and a mounting structure configured to be mounted on a bicycle, the master cylinder being supported by the mounting structure and having a piston movably disposed in a master cylinder bore to move in response to operation of the operating lever; and
a hydraulic brake hose having a first end and a second end, the hydraulic brake hose being filled with hydraulic fluid, the first end of the hydraulic brake hose being attached to the master cylinder with a first sealing material disposed between the first end of the hydraulic brake hose and an outlet port of the master cylinder, the sealing material blocking fluid communication between the master cylinder and the hydraulic brake hose until the first sealing material is ruptured in response to a hydraulic fluid pressure developed by movement piston in response to the operation of the operating lever.

2. The bicycle hydraulic brake system according to claim 1, further comprising
a first tubular insert disposed in an interior passage of the hydraulic brake hose at the first end of the hydraulic brake hose, the first sealing material overlying the first tubular insert.

3. The bicycle hydraulic brake system according to claim 1, wherein
the hydraulic brake hose further includes a flexible tube and a first connector disposed on a first end portion of the flexible tube, the first connector being configured to connect to the master cylinder.

4. The bicycle hydraulic brake system according to claim 1, wherein
the first sealing material is formed of a sheet.

5. The bicycle hydraulic brake system according to claim 2, wherein
the first sealing material is formed of a sheet.

6. A bicycle hydraulic brake system comprising:
a bicycle hydraulic operating mechanism including a master cylinder, an operating lever operatively coupled to the master cylinder, and a mounting structure configured to be mounted on a bicycle, the master cylinder being supported by the mounting structure and having a piston movably disposed in a master cylinder bore to move in response to operation of the operating lever;
a brake caliper having an inlet port and configured to be attached to a bicycle, the brake caliper being configured to be actuated by hydraulic pressure; and
a hydraulic brake hose having a first end and a second end, the hydraulic brake hose being filled with hydraulic fluid, the first end of the hydraulic brake hose being attached to the master cylinder with a first sealing material disposed between the first end of the hydraulic brake hose and an outlet port of the master cylinder, and the second end of the hydraulic brake hose being attached to the brake caliper with a second sealing material disposed between the second end of the hydraulic brake hose and the inlet port of the brake caliper,
the first sealing material blocking fluid communication between the master cylinder and the hydraulic brake hose until the first sealing material is ruptured in response to hydraulic fluid pressure developed by operation of the operating lever, and the second sealing material blocking fluid communication between the hydraulic brake hose and the brake caliper until the second sealing material is ruptured in response to hydraulic fluid pressure developed by movement piston in response to operation of the operating lever.

7. The bicycle hydraulic brake system according to claim 6, wherein
the first and second sealing materials are formed of a sheet.

8. The bicycle hydraulic brake system according to claim 7, wherein
the first and second sealing materials are formed of a foil.

9. The bicycle hydraulic brake system according to claim 6, wherein
the first sealing material is fixed to the master cylinder such that the first sealing material overlies and seals the outlet port of the master cylinder.

10. The bicycle hydraulic brake system according to claim 6, wherein
the second sealing material is fixed to the brake caliper such that the second sealing material overlies and seals the inlet port of the brake caliper.

11. The bicycle hydraulic brake system according to claim 6, wherein
the first and second sealing materials are fixed to the first and second ends of the hydraulic brake hose such that the first and second sealing materials seals the first and second ends of the hydraulic brake hose.

12. The bicycle hydraulic brake hose structure according to claim 6, further comprising
a first tubular insert is disposed in an interior passage of the hydraulic brake hose at the first end of the hydraulic brake hose, the first sealing material overlying the first tubular insert; and
a second tubular insert disposed in an interior passage of the hydraulic brake hose at the second end of the hydraulic brake hose, the second sealing material overlying the second tabular insert.

13. The hydraulic brake hose structure according to claim 6, wherein
the hydraulic brake hose further includes a flexible tube, a first connector disposed on a first end portion of the flexible tube, and a second connector disposed over a second end portion of the flexible tube, the first connector being configured to connect to the master cylinder and the second connector being configured to connect to the one end of the hydraulic brake hose.

14. A method of assembling a bicycle hydraulic brake system, the method comprising:
providing a caliper, a hydraulic brake hose, and a bicycle hydraulic operating mechanism including an operating lever, a master cylinder and a mounting structure,
filling the hydraulic brake hose with hydraulic fluid;
attaching opposite ends of the hydraulic brake hose to the master cylinder and the caliper;
installing a first sealing material between one of the ends of the hydraulic brake hose and one of the master cylinder and the caliper prior to attaching the one end of the hydraulic brake hose to the one of the master cylinder and the caliper such that hydraulic fluid is prevented from flowing between the hydraulic brake hose and the one of the master cylinder and the caliper by the first sealing material disposed therebetween;
increasing pressure within the master cylinder by operating the operating lever of the bicycle hydraulic operating mechanism to force hydraulic fluid in the master cylinder to break the first sealing material.

15. The method according to claim 14, further comprising
installing a second sealing material between the other one of the ends of the hydraulic brake hose and the other one of the master cylinder and the caliper prior to attaching the other end of hydraulic brake hose to the other one of the master cylinder and the caliper such that hydraulic fluid is prevented from flowing between the hydraulic brake hose and the other one of the master cylinder and the caliper by the second sealing material disposed therebetween; and
operating the operating lever of the bicycle hydraulic operating mechanism further to break the second sealing material.

16. The method according to claim 14, wherein
the installing of the first sealing material is performed by attaching a sheet material to the one of the ends of the hydraulic brake hose.

17. The method according to claim 14, wherein
the installing of the first sealing material is performed by attaching a sheet material to the master cylinder.

18. The method according to claim 14, wherein
the installing of the first sealing material is performed by attaching a sheet material to the caliper.

19. The method according to claim 14, wherein
the installing of the first sealing material is performed by attaching a sheet material to a first tubular insert that is disposed in an interior passage of the hydraulic brake hose at the one end of the hydraulic brake hose.

20. The method according to claim 15, wherein
the installing of the first sealing material is performed by attaching a sheet material to a first tubular insert that is disposed in an interior passage of the hydraulic brake hose at the one end of the hydraulic brake hose,
the installing of the second sealing material is performed by attaching a sheet material to a second tubular insert that is disposed in an interior passage of the hydraulic brake hose at the other end of the hydraulic brake hose.

\* \* \* \* \*